United States Patent [19]

Boyer

[11] 3,891,778

[45] June 24, 1975

[54] METHOD OF MAKING PROTEIN FOOD PRODUCTS RESEMBLING CHEESE

[75] Inventor: Robert Allan Boyer, Creve Coeur, Mo.

[73] Assignee: Ralston Purina Company, St. Louis, Mo.

[22] Filed: Nov. 18, 1970

[21] Appl. No.: 90,839

Related U.S. Application Data

[63] Continuation-in-part of Ser. No. 40,365, May 25, 1970, abandoned.

[52] U.S. Cl. ................ 426/573; 426/656; 426/431
[51] Int. Cl. ............................................. A23j 3/00
[58] Field of Search ......... 99/17, 63, 122, 115, 116, 99/117, 98, 64, 123; 426/350, 364, 431

[56] References Cited
UNITED STATES PATENTS

| | | | |
|---|---|---|---|
| 3,303,182 | 2/1967 | Sakai et al. | 99/17 X |
| 3,310,406 | 3/1967 | Webster | 99/17 X |

*Primary Examiner*—James R. Hoffman
*Attorney, Agent, or Firm*—Virgil B. Hill

[57] ABSTRACT

This invention relates to novel protein food products specifically spreadable protein food products and methods of producing these products from a vegetable proteinaceous material. The food products which may be produced may be of a smooth, spreadable texture resembling a process-type cheese spread as well as other dairy products which are spreadable in nature such as for example, a butter or margarine. The method of producing these food products with a vegetable proteinaceous material as the major ingredient generally comprises acidifying an aqueous slurry of the vegetable proteinaceous material to yield the damp, viscous curd of the proteinaceous material followed by treatment of the curd in combination with various flavorings and ingredients such as fats, salts, and starches including heat setting in order that a highly desirable, smooth, spreadable texture may be imparted to the food product and make it closely resemble a natural dairy spread.

10 Claims, No Drawings

METHOD OF MAKING PROTEIN FOOD PRODUCTS RESEMBLING CHEESE

BACKGROUND OF THE INVENTION

This application is a continuation-in-part of my copending application Ser. No. 40,365 filed May 25, 1970, now abandoned.

This invention relates to novel protein food products and a process for producing the same.

Spreads such as for example, cheese spreads have been much in demand by the consumer either as a food staple or as a snack product. Additionally, various spreadable food stuffs such as for example, butter or margarine still remain as a principle food product for a large majority of the consuming public. Most natural spreadable food stuffs like cheese spreads or butter, while of an appealing and desirable taste and texture, suffer somewhat from variations in quality. Likewise, they are composed mostly of a large percentage of fat which is largely responsible for the spreadable quality of the spread. The high percentage of fat which is needed, however, further increases the caloric content of the food stuff and generally makes it unsuitable for dietary purposes.

Simulated spreadable food products have been previously attempted from various more readily available vegetable sources. Sich sources include a vegetable protein material such as, for example, oleaginous protein materials such as soybeans, cottonseed, peanuts, etc. The primary advantage of food products containing a high percentage of vegetable protein lies not only in the nutritive boost achieved by the protein, but also in the dietary improvement which would result because of the low calory content of the protein material which is used. It may also be more economical to employ readily available vegetable protein materials in place of the more expensive animal protein or similar materials.

Most synthetic food products which have been composed substantially of vegetable protein materials have been produced and textured as meat substitutes. Accordingly, they are designed to resemble meat in texture and mouthfeel by imparting a fibrous or chewy structure to the vegetable protein material. While such a fiber structure is highly desirable and useful in making simulated meat products, it is not suitable for nor does it closely resemble other types of food products which naturally do not have the texture or structure of connective animal tissue or meat. As previously noted, most food products which are spreadable in nature, such as a cheese spread or butter, incorporate a high percentage of fat as the fatty phase to produce a product which percentage of fat as the fatty phase to produce a product which is readily spreadable at room temperature. Previously, when a spread was desired which was composed substantially of vegetable protein, it was necessary to incorporate a very high percentage of fat as a fatty phase to produce a smooth spreadable texture. Such products not only failed to take advantage of the higher nutritive value of the vegetable protein, but further had a high caloric intake because of the percentage of fat. Additionally, such products contained only a small portion of vegetable protein and were also lacking in desirable mouthfeel characteristics and smoothness. Rather, most of these products were either grainy, or of a gelative type of consistency with poor spreadability. Thus, the prior art has been generally deficient in providing a process for the production of spreadable food products with acceptable texture when the food product is composed substantially of vegetable protein.

SUMMARY OF THE INVENTION

I have, therefore, developed spreadable food products which are composed substantially of vegetable proteinaceous material, as well as processes for making such products, which substantially overcome difficulties noted in the prior art when forming spreadable food products from vegetable protein.

I can produce products with a vegetable proteinaceous material as the sole or substantially major ingredient, having a texture which may be considered to be both smooth and creamy, and also readily spreadable without the need for a high percentage of fat to impart spreadability or smoothness. This not only takes full advantage of the superior nutritive value of the vegetable protein, since the protein content is not reduced by the presence of other materials such as a high percentage of fat, but also reduces the caloric content of the product and makes it suitable for dietary purposes.

The spreadable smooth textured food products which I have devised with vegetable proteinaceous material as the major ingredient may be generally produced by a process employing a unique damp, viscous curd. This unique curd is derived from the slurrying of a protein material, followed by the acidification and precipitation of the curd therefrom. It has qualities making it highly functional as a spread. The curd of the vegetable proteinaceous material may be processed on either a batch or continuous basis. The curd is combined with flavoring and various other ingredients by compressing the same. The process involves holding the vegetable proteinaceous material together by the employment of pressure, either in the positive or negative sense. The employment of pressure in a positive sense generally is meant to refer to the application of a positive external pressure to the curd relative to the pressure of the curd (normally atmospheric). The employment of pressure in a negative sense is meant to refer to application of a pressure which is negative relative to that of the curd, normally removal or evacuation of entrapped air or gas in the curd will result in the improvement of pressure in the negative sense. Application of a positive or negative pressure in such a manner, compresses the proteinaceous curd material to hold the same together, so that the product may be heat set and form an irreversible proteinaceous gel but with a smooth or spreadable texture and with an absence of voids or spongy appearance.

It is, therefore, a major object of the present invention to form spreadable or smooth textured food products from a unique, damp, viscous curd derived by the precipitation of a slurry of vegetable protein. The curd is a hydrated form of vegetable protein which, because of its high water capacity, has qualities making it particularly suitable as a major ingredient for a spreadable or smooth textured food product.

DESCRIPTION OF THE PREFERRED EMBODIMENTS

The vegetable proteinaceous materials which are particularly useful in the production of the protein food products of the present invention are those proteinaceous materials derived from various oleaginous materials, in particular the oil seeds such as soybeans. The proteinaceous material which is highly functionable in my invention may be termed as the damp curd or isolated protein from the oleaginous protein source. The following process will generally describe the production of vegetable proteinaceous materials which may be employed in my invention.

Soybean meal or flakes which have been defatted are the preferred starting material. The defatted or solvent extracted soybean meal or flakes are then dispersed in an aqueous suspension in which the water is employed in an amount of from about 10 to 20 times by weight of the soybean flakes or soybean meal employed. This aqueous solution or slurry with the soybean material dispersed therein is subjected to an elevated pH between 8 and 11 to largely put the proteinaceous material in solution. Following this, suspended solids are removed from the solution by centrifugation or similar means until clarification of the solution is obtained.

After the protein is put into solution at the elevated pH and the other solids are removed, the proteinaceous solution is then subjected to precipitation either with or without a prior heating step. If the heating step is used, a special curd is obtained during precipitation, as described fully hereinafter. Precipitation is achieved by adjusting the pH to a value at or near the isoelectric point of the protein, i.e. in the pH range between about 4.5 and 5.5. This pH adjustment is done by the addition of a suitable acidifying agent such as phosphoric, acetic, lactic, citric, hydrochloric, sulfuric or sulfurous acid or other types of inorganic or organic acids known to be suitable for food use.

The precipitated protein or curd produced during this stage of the processing of the vegetable proteinaceous material may be one of several types and consequently require alternate means of production or processing. For example, if no heat is employed prior to the acidification step, a type of curd results which generally has a solids content by weight of 15 to 45%. This precipitated protein or curd may be separated by decantation, filtration, or centrifugation. The filtered curd mass is removed and subsequently washed two to three times to remove and solubilize various carbohydrates, and hence objectionable "bean-like" flavors which the acid precipitation step is designed to remove. This type of damp curd-like mass will generally have a solids content by weight of about 15 to 45%, a pH between about 4.5 and 5.0, and a moisture range of about 55 to 85%. This form of precipitated protein, while suitable for the production of the spreadable food products of my invention, is not the preferred type of curd for products of a spreadable nature. The following alternate means produce a unique viscous curd which is preferred for the production of the spreadable food products of my invention.

This alternate process for the production of a unique curd mass or precipitated protein primarily concerns employment of an elevated temperature prior to the acidification step. Generally, the elevated temperature used is about 160° F. to 310° F., for a period of time of from about 10 seconds to 30 minutes. More specifically, the temperature usually will be controlled between about 210° F. to 250° F. for a period of time of between 10 and 30 seconds. The time of the heating operation is a function of the temperature employed in the process. At high temperatures a very short heating step is used, while at lower temperatures a somewhat longer heating step is employed. For example, at 210° F. to 250° F., a heating time of between 10 and 30 seconds is satisfactory, while at about 160° F., it is necessary to about 30 minutes. If a temperature as high as 310° F. is employed, a time of only about 5 seconds is used in the process.

The damp or hydrated curd produced by this alternate process may be generally described as a "fluffy" curd. It has a solids content lower than that of the other type of curd, and generally in the range of 10 to 20% by weight, with a pH between about 4.6 and 5.5, and a moisture content of about 80% to 90% by weight. The precipitated fluffy or hydrated curd may be separated from the liquid phase by filtration of the mass, decantation of the liquid, or centrifugation. The separated mass or curd is likewise washed 2 to 3 times to remove any previously unsolubilized sugars or carbohydrates. The basic unique product obtained is one of excellent taste characteristics, color, and functionality. The product has an optimum combination of functional properties not obtainable heretofore from protein isolates, besides having an excellent bland flavor, free of the characteristic soy flavor.

The material or hydrated protein may be used directly in food products without drying. It is particularly desirable in a spreadable food product because of its high water and low solids content which allows it to retain a unique smooth texture. The product is an attractive, white, homogeneous, creamy substance containing most of the protein in a combination partially dissolved state and partially dispersed colloidal state that does not tend to settle out of its aqueous base. The product is completely bland to the taste, with the bitter flavor characteristics of soy protein being gone. In dry form, it is actually capable of rapid rehydration to a suspension, simply by adding water and stirring.

The novel processing not only drastically improves the flavor and odor, and provides functionality, but also causes a distinct and advantageous change in appearance. That is, prior to such processing, the color is yellowish, particularly as suspended in slurry form. After processing, the product is a whitish, creamy substance. When dried, the whitish colored product has the attractive appearance of dried skim milk.

It is theorized that the unique properties of the protein isolate which results from the process of this invention are due to a change in the structure of the soy protein during the process. The soy protein recovered in the extraction process is primarily soy glycinin, a complex protein having a tightly folded structure and a high degree of cross-linking which holds the molecular chains in close proximity. The cross-linking in the glycinin molecules is primarily in the form of disulfide or S—S bonds. During the heat treatment of the extracted liquor by the process of the invention, it is believed that some of the disulfide bonds are split and reduced to sulfhydryl groups. The splitting of some of the disulfide bonds is believed to relax some of the force holding the protein chains together, so that the distance between adjacent chains or folds increases and more of the polar groups of the protein molecules are exposed. Water is then able to wedge between some of the adjacent protein chains to bond with the available polar groups and/or hydrate portions of the protein molecules which were not previously reactive. The fact that additional water is bound in the protein molecule is believed evidenced by the different per cent solids per volume and per cent solids per weight values are compared to protein isolated by standard methods. The compaction ratio of the protein produced by the method of this invention is another indication that additional water is held in the protein molecules. Hence, as a consequence of the greater number of disulfide bonds which are believed severed by the process of the invention, the protein isolate produced exhibits the retention of a greater quantity of water on compaction.

Specifically, the hydrated curd typically has a white color having a brightness of above 60, preferably above 65, and has a compaction ratio of above 0.10, and preferably between 0.15 and 0.30. The brightness of the product was measured with a Photovolt reflection meter model 610 by adjusting the solids content to 10.0% by weight and placing a sample in a Petri dish until the dish is filled with the sample. Using this technique, the Petri dish is covered and the per cent of whiteness is measured as the per cent compared to a magnesium oxide standard. This accepted technique is described in the Photovolt Corporation Circular 660, "Photovolt Reflection Meter Model 610," Photovolt Corp., New York, N.Y. June, 1964.

The unique protein isolate or curd product has a very high specific volume believed due to water which is bound in and/or to the protein molecules. The specific volume is determined by adjusting the product to a solids content of 2% by weight and centrifuging a 50 ml. sample of the product at 570 g for 10 minutes. The volume of the recovered centrifuged curd divided by the weight of total dry solids present in the centrifuged curd equals the specific volume of the curd.

The compaction ratio of the protein isolate product is determined by centrifuging a 50 ml. sample of the product which has been adjusted to a solids content of 2% by weight of 570 g for 10 minutes; the ratio of the volume of centrifuged solids to the volume of supernatant liquor is the compaction ratio. The amount of retained moisture in the material is determined by measuring the moisture content of the centrifuged solids. The retained moisture is the proportion of grams $H_2O$/gram solids.

In the production of spreadable food products utilizing the curd of the vegetable proteinaceous material, especially the hydrated damp curd isolated at the elevated temperature, various ingredients may be employed in combination with the curd to provide characteristics in the resultant products closely simulating their natural counterparts. As previously noted, the hydrated curd is preferable in the formation of spreadable food products and smooth textured food products although the curd which is not isolated at an elevated temperature is also suitable.

To produce spreadable food products such as butter or cheese spread or smooth textured products such as puddings, there are several factors related to the proteinaceous material which should be controlled because of their collective effect on the consistency, smoothness, or spreadability of the final product. Firstly, the pH of the curd influences the consistency as well as the flavor of the spreadable or smooth textured food products and is preferably controlled within the range of about 4.8 to 7.0. In fact, if the pH of the curd is increased or maintained as by the addition of suitable alkaline materials in the range of from 5.4 to 6.0, the best spreadability or smoothness of products made with the curd is obtained. Controlling the pH within this range, likewise aids in maintaining spreadability or smoothness of products when produced by a continuous process as opposed to a batch process.

Secondly, as previously noted, the solids content of the curd influences the texture of the spreadable products made therewith. If other than a fluffy or hydrated curd is used, the solids content should preferably be reduced to the range of 10 to 18% to make a suitable spreadable or smooth product. This may be conveniently accomplished by adding water and mixing.

In a batch-type process for production of a spreadable or smooth food product, the curd, either hydrated or regular, is mixed with various ingredients which contribute to and provide characteristics for the resultant products. The curd with the adjusted solids content is placed in a suitable mixer or similar device, and the pH preferably adjusted to the range of 5.4 to 6.0. Various ingredients such as salt, sugar, fat, starches, gums, preservatives, and flavors are then mixed with the curd to contribute desired characteristics to the final product.

The salt, such as sodium chloride, increases the spreadability or smoothness or the products of the present invention. It is believed that, during heat setting of the protein to form a cohesive, smooth, spreadable body, the salt aids in cross-linkage of the protein molecules, and controls cohesiveness of the protein mass to some extent. It may generally be added in an amount of about 1 to 3% by weight of the final product, although preferably within the range of 0.4 to 2% by weight of the final product. The exact amount also depends on the desired taste of the final product.

It is also desirable in some instances to add a small percentage of an animal protein such as sodium caseinate since this also enhances spreadability of the final product. The animal protein may normally be added in an amount of from 1 to 15% by weight of the final product depending on the exact consistency desired, preferably about 5%.

Further, the addition of animal or vegetable fat is not necessary for spreadability or smoothness of the products of the present invention; nevertheless, the addition of a relatively small amount of fat, in an amount from about 2 to 15% by weight, preferably about 5%, of the final product, contributes to the taste and mouthfeel of the products, enabling the present products to even more resemble exactly their natural counterparts. The exact amount added is dependent on the flavor desired.

Other additives may be added to the mixture at this stage. Examples are gums or starches in an amount of 0.2 to 1% by weight of the final product. These tend to promote the water binding properties of the product and contribute to the body or consistency thereof. They are particularly useful when, for example, curd with a lower solids content than the range specified is employed, i.e. less than 10%. Such additives additionally aid in the prevention of syneresis or "weeping" of the final product upon storage. Various preservatives may also be added to contribute to the shelf life of products produced in the present invention. A typical preservative is sorbic acid, and preferably added in an amount of about 0.2% by weight of the final product. Corn syrup may also be added in combination with various flavoring ingredients depending on the cheese or dairy flavor employed to tone down any astringent flavors which are present. Various imitation cheese, butter, or dairy flavors as well as fruit, chocolate, or flavorings suitable for puddings may be employed, depending on the final product and the particular use. Specific flavors are not critical to the practice of the present invention, and may ordinarily be determined by one skilled in the art knowing the type of final product desired.

The curd and other ingredients are then mixed as for example, by homogenization. The homogenization may be carried out by any of the known methods or with any of the known pieces of equipment for performing such. The present invention is not intended or considered to be limited to the degree of homogenization or manner of performing it. This is only to physically masticate and mix the proteinaceous curd and various ingredients so that such may be easily employed in the process I have developed.

After homogenization or mixing of the slurry of the proteinaceous material and the various flavorings and other ingredients, the vegetable proteinaceous material may be compressed and held together to produce a smooth textured product by several alternate means. It is theorized that the compressing or holding of the vegetable proteinaceous material together is more specifically accomplished by the protein molecules being forced together and in close proximity to produce a consistently smooth textured product. As noted, there are several alternate processes by which a smooth texture may be imparted to a spreadable type food product with a vegetable proteinaceous material as the major ingredient. One such process consists of compressing the vegetable proteinaceous material together by the employment of pressure in a negative sense which is generally defined to mean removal of the entrapped air or gas from the slurry of the vegetable proteinaceous material by suction or vacuum, to prevent its localization and expansion of the protein material during heat setting of the same. The same results may also be achieved by not removing the air, but keeping it substantially dispersed or disposed throughout the product during heat setting and preventing its expansion, by the application of a positive external pressure. This also prevents localization of the air during heat setting of the protein. The term localization is generally meant to mean the collection or assimilation of air or gases in the product so as to create visually noticeable bubbles or voids which would be permanently set in the protein slurry upon heat setting of the same.

Using the negative pressure technique noted, after homogenization, the air entrapped in the protein slurry and the various flavorings and other ingredients are removed by subjecting the homogenized slurry to a suitable vacuum to dearate the same. Dearation of the homogenized slurry can be accomplished by the employment of a vacuum of at least about 27 inches of mercury on the viscous slurry. Lesser vacuums do not usually remove a sufficient amount of air from the proteinaceous slurry to compress the slurry and place the same in such close and intimate proximity so that localization of the air will not occur when the protein material is heat set, i.e. employment of a lesser vacuum will usually result in incomplete removal of air or gas which if present during heat setting of the protein, expands and localizes to create undesirable voids or bubbles during heat setting. This produces a crumbly or spongy structure as opposed to a desirable smooth, creamy texture. The dearation may be carried out in any type of apparatus capable of attaining the vacuum indicated and suitable for commercial production of smooth textured products.

Alternatively, using the positive pressure technique, a smooth texture of spreadable food products may be obtained if, instead of dearating the slurry, the air is allowed to remain therein but is kept uniformly disposed throughout the slurry and prevented its expanding and localizing during heat setting of the protein material. This may be conveniently carried out by subjecting the homogenized slurry to an external or positive pressure, as by confinement of the same in a container, space, or limited space so that the protein material is compressed or kept in intimate relation during heat setting; thus air is entrapped therein and is prevented from forcing the proteinaceous material apart to creat bubbles or voids and a resulting undesirable, crumbly texture. Prevention of localization of the air in this manner allows production of a smooth textured product which maintains its spreadable character because of its hydrated characteristics and low solids content. The positive pressure which is necessary may typically be only slightly above ambient, and may be merely that pressure which is exerted on the material by a container such as a pipe casing or can. Typically very high pressures are not necessary. It should also be realized that a combination of internal negative pressure and external positive pressure can be employed.

Following treatment of the proteinaceous slurry to compress or hold the protein material together, heat setting of the slurry may be carried out at a temperature of at least about 160° F. for a period of time which will vary depending on the temperature employed. The particular temperature and time will vary depending on the exact temperature and time. Higher temperatures require shorter heating time and lower temperatures longer heating time. Heat setting of the protein slurry while being held together results in thickening of the slurry, and promotes the formation of a smooth textured slurry which is thick yet spreadable in nature. Generally, the degree or amount of heat to accomplish heat setting of a spreadable type food product composed substantially of vegetable protein may be typically high enough to at least pasteurize the product and reduce substantial bacteria contamination. Such a temperature will typically be in the vicinity of around 212° F. or higher.

The version of this novel process which is preferred from the standpoint of economy and convenience, particularly for commercial practice, is the continuous version as opposed to the batch process version previously discussed. Generally, this process version comprises rapidly setting the uniform and homogenized slurry with or without dearation through a series of successive heat exchangers. This is done at such a rate and in such a manner that the homogenized slurry is continuously agitated or mixed by movement through the system. Thus, entrapped air is kept disposed throughout the slurry while the same is under confinement, the confinement producing an external pressure as well as a back pressure, this pressure compresses or holds the proteinaceous material together simultaneously with rapid heat setting of the slurry, to yield a smooth textured, thickened, spreadable product.

For example, the proteinaceous slurry may be pumped from a homogenizer through a pipe, say three eighths inch or so in diameter, at a rate of about 2 lbs. per minute, through two successive heat exchangers held at a temperature of from about 220° F. to as high as 300° F. Typically, the exact temperature employed in the heat exchanger will be dependent upon whether either a pasteurized or sterilized product is desired. To produce a sterile product, a temperature above about 250° F. is needed. The hold time of the slurry in each heat exchanger may be varied between about 10 and 25 seconds, with the exact hold time being dependent upon the temperature employed. Following this, the product which has been heat set and converted to a thickened spreadable product, is cooled by passing it through a cooling coil or heat exchanger set at a low temperature of about 60° F. up to about 130° F. Following this, the material may be packaged in suitable containers.

Confinement of the slurry in the pipe during the continuation process, along with the continuous agitation or mixing which is produced by the continuous pumping or movement of the slurry through the pipe, keeps entrapped air disposed throughout the product and prevents any localization of the air or gases to cause bubbles or voids. This continuous means of producing smooth textured, spreadable protein food products is preferable from the standpoint of being readily adaptable to commercial production of large quantities of cheese spreads, butters, margarines, or spreads and puddings in general with a vegetable proteinaceous material as the major ingredient.

Briefly, therefore, the product produced by either the batch or continuous versions of the process, and composed substantially of a vegetable proteinaceous material is a smooth textured product of a spreadable quality. Depending upon the flavors employed, it can be made to resemble a cheese spread, margarine, butter, or other type of dairy product without the use of a high percentage of fat. Such a product has the desirable characteristics of being composed substantially of protein while being low in fats and sugars. Thus, it is suitable for a high protein, low calorie diet. Typically, the product will contain from 10 to 30% protein by weight, have a 45 to 65% moisture content by weight, have a smooth uniform texture, spreadable in nature, and exhibit substantially no visible weeping or separation of moisture from the product. A spreadable product composed substantially of vegetable protein also has a number of highly desirable functionable characteristics. That is to say, since it does not melt or become liquid at low temperatures, it may be used as a filler for cookies, pies, rolls, or other pastry products. It may be added prior to cooking or baking without weeping or melting of the filler during baking or cooking in sharp contrast with standard cheese spreads or fillers produced from dairy products. Such dairy products melt at very low temperatures and are not suitable for such applications.

Although the inventive concepts will be readily understood from the foregoing description by one having ordinary skill in the art, the following examples are given to further illustrate the invention and to assure a complete understanding.

EXAMPLE 1

Soybeans were cracked, dehulled, and flaked and the flakes extracted with hexane to remove the oil and produce a high DPI soybean flake. The defatted flakes were added to an aqueous bath. A food grade alkaline reagent, sodium hydroxide, was added until a pH of 8.75 was reached. The material was extracted for 30 minutes and then centrifuged to clarify the extract. The clarified liquor had a pH of 10. It was heated to about 210° F. for about 30 seconds and cooled. The soy protein material was precipitated from the liquor by adding phosphoric acid until the isoelectric point was reached at about a pH of 5.0. The precipitate was then washed with water and centrifuged to concentrate the protein isolate. The isolate had a specific volume of 6.4, a solids content by weight of 16.9% and a protein content of 96% on a dry basis. The product was compacted in an International Model UV 10 inches diameter centrifuge for 10 seconds at 570 g and displayed a compaction ration of 0.22. The retained water in the protein material was 5.1 grams per gram of solids. The concentrated isolate was white, bland, and had a brightness of 65.0 when taken by the Photovolt Model 610 color meter.

EXAMPLE 2

A cheese type spread of a smooth texture and composed substantially of vegetable protein was prepared. The proteinaceous curd-like mass of fluffy curd which was produced in Example 1 was employed in the preparation of this spread. The following ingredients were added to a mixer and uniformly blended.

| | |
|---|---|
| 1000 | grams of "fluffy" curd (10.7% solids) |
| 210 | cc. of trisodium phosphate (20% solution by weight) |
| 449 | grams of vegetable oil |
| 175 | grams of sodium chloride |
| 108 | grams of corn starch |
| 16.4 | grams of Keltrol Xanthum gum |
| 87 | grams of sodium caseinate |
| 79 | grams powdered cheese flavor (Ed Long imitation cheese flavor No. 1200s) |
| 520 | grams of corn syrup |
| 26 | cc. of FDNC No. 5 (2.5% solution by weight) |
| 17.8 | grams sorbic acid |
| 435 | grams high acid butter milk solids |

This mixture was homogenized and placed in a container. The container was then placed in a desiccator which was in turn subjected to a vacuum of around 29 inches of mercury for about 10 minutes until bubbling of the air through the mixture stopped. The dearated mixture was then placed in individual ceramic containers or small crocks having loose covers, and heated in a steam cooker at about 212° F. for about 90 minutes. They were then removed, sealed tightly, and allowed to cook. The resulting product was an extremely smooth textured, uniform appearing product that did not shrink or expand after heating. It could be easily spread on crackers or bread whether cold or warm. It had the taste and aroma of a processed cheddar cheese spread.

EXAMPLE 3

A cheese type spread of a smooth texture, and composed substantially of vegetable protein was produced. The proteinaceous curd-like mass or fluffy curd which was produced at an elevated temperature as in Example 1 was employed in production of this spread. The following ingredients were added to a mixer and uniformly blended:

| | |
|---|---|
| 1500 | grams "fluffy" curd (16% solids) |
| 37.5 | cc. Trisodium phosphate (20% solution by weight) |
| 30 | grams sodium chloride |
| 300 | grams powdered cheese flavor (Bordens No. 3516) |
| 16 | grams powdered cheese flavor (Ed Long |

-Continued

| | |
|---|---|
| (No. 1200s) | |
| ml. | Liquid cheese flavor |
| 3 cc. | Lactic acid |
| 500 cc. | Refined vegetable oil |
| 2.3 grams | sorbic acid |

This mixture was homogenized and then placed in an open shallow dish. The dish was placed in a desiccator which was subjected to a vacuum of slightly more than 29 inches of mercury for about 10 minutes until bubbling of the air through the mixture stopped. The dearated mixture was then placed in individual ceramic containers or small crocks having loose covers and heated in a steam cooker at about 212° F. for about 100 minutes. They were then removed, sealed tightly and allowed to cool. The resulting product was an extremely smooth textured and uniform appearing product. It did not shrink or expand after heating. It could easily spread on crackers or bread, whether cold or warm. The product had generally the following analysis:

| | |
|---|---|
| Moisture | 59.5% |
| Protein | 11.0% |
| Fat | 23.0% |

EXAMPLE 4

The homogenized slurry resembling a cheese spread as produced in Example 2 was then subdivided into individual portions of 45 grams apiece and placed in individual casings about 5 ½ inches in length. The casings were tied on both ends to exert a uniform positive pressure on the slurry and the casings were placed in a steam atmosphere and heated for about 30 minutes at a temperature of 212° F. After the mixture in the casing was cooled, the resulting product was an extremely smooth textured and uniform appearing product. It did not shrink or expand during heating. It resembled a cheese spread and could easily be spread on bread or crackers.

EXAMPLE 5

The homogenized slurry resembling a cheese spread as produced in Example 2 was rapidly and continuously pumped from the homogenizer through a series of three heat exchangers. The first two heat exchangers were held at a temperature of about 220° F. to 250° F. The third and last heat exchanger in the series was at a temperature of about 60° to 80° F. for cooling the slurry. The slurry was pumped from the homogenizer through the series of heat exchangers at a rate of about 2 lbs. per minute such that the holding time of the slurry in each heat exchanger was about 15 to 25 seconds. After passage of the slurry through the third exchanger, it was proportionally metered into individual containers in which it was allowed to further cool. The resulting product was an extremely smooth textured and uniform appearing product resembling a cheese spread. It could be easily spread on crackers or even bread, whether it was cold or warm.

EXAMPLE 6

A butter type spread of a smooth texture but composed substantially of vegetable protein was produced. The proteinaceous curd-like mass or fluffy curd which was produced at an elevated temperature in Example 1 was employed in production of this butter type spread. The following ingredients were added to a mixer and uniformly blended:

| | |
|---|---|
| 304 | grams "fluffy" curd (16% solids) |
| 20 | ml. Trisodium phosphate (20% solution) |
| 7.5 | grams sodium chloride |
| 50 | grams milk solids (26% fat) |
| 50 | grams high acid buttermilk solids |
| 10 | ml. FD & C Yellow No. 5 solution |
| 2.5 | grams sugar |
| .0437 | ml. butter flavor (Ed Long No. 230) |

This mixture was homogenized and then placed in an open shallow dish. The dish was placed in a desiccator which was subjected to a vacuum of slightly more than 29 inches of mercury for about 35 minutes until bubbling of the air from the mixture stopped. This dearated mixture was then placed in individual containers with loose covers and heated at about 212° F. for about 30 minutes. Then the containers were sealed and cooled. The resulting product was a smooth product of a completely smooth and even appearance. It did not shrink or expand after heating. It resembled butter but it could also be easily spread on crackers or bread, whether warm or cold.

EXAMPLE 7

A pudding of a smooth texture and composed substantially of vegetable protein was prepared. The proteinaceous curd-like mass or fluffy curd which was produced at an elevated temperature in Example 1 was employed in production of a smooth textured pudding. The following ingredients were accordingly added to a mixer and uniformly blended:

| | |
|---|---|
| 300 | grams "fluffy" curd (11.6% solids) |
| 15 | ml. Trisodium phosphate (20% solution) |
| 60 | grams sugar |
| 2 | grams sodium chloride |
| 15 | grams cocoa |
| 1.5 | ml. vanilla flavor |

This mixture was homogenized into a uniform slurry and then placed into an open shallow dish. The dish was placed in a desiccator which was then subjected to a vacuum of slightly more than 29 inches of mercury of about 35 minutes until bubbling of the air from the mixture stopped. This dearated mixture was then placed in individual containers with loose covers and heated at about 212° F. for about 30 minutes. The resulting product had a very smooth texture and mouthfeel and had a pleasant chocolate pudding flavor.

The spirit and scope of my invention will be set forth in the appended claims and it is my intention to cover thereby all equivalents and modifications as may reasonably be included within their scope.

I claim:

1. A process for forming a smooth, textured food product from soybean protein comprising: forming a dispersion of defatted soybean meal and water at an elevated pH above the iso-electric point of the soy protein thereby extracting the protein from the soybean meal, removing the suspended solids from the aqueous protein extract, adjusting the pH of the separated aqueous extracted protein dispersion to between about 8 to 11 and heating the dispersion to between about 160° to 310° F. for between about 5 seconds to 30 minutes to produce a viscous hydrated heat-treated aqueous protein solution, precipitating the protein by adjusting the pH of the solution to about the isoelectric point of the protein, separating the precipitated protein from the solution to recover a viscous, hydrated, heat-treated aqueous protein, homogenizing the viscous hydrated heat-treated aqueous protein to form a uniform slurry, compressing the uniform slurry to hold the proteinaceous material together and heat setting the protein to impart a smooth texture to the product.

2. The process of claim 1 wherein the separated aqueous extracted soy protein is heated to between about 210° to 250° F. for between about 10 to 30 seconds.

3. The process of claim 1 wherein the viscous hydrated heat treated aqueous protein is adjusted to a pH of between about 4.8 to 7.0 prior to heat setting the protein.

4. The process of claim 3 wherein the pH is adjusted to between about 5.4 to 6.0.

5. The process of claim 1 wherein the heat treated aqueous protein is heat set at a temperature above about 160° F.

6. The process of claim 5 wherein the heat treated aqueous protein is heat set at a temperature between about 160° to 300° F.

7. The process of claim 1 wherein additional flavorings and food materials are added to the heat treated aqueous protein prior to homogenizing.

8. The process of claim 1 wherein the compressing step comprises removing air from the uniform slurry to substantially hold the proteinaceous material together and impart a smooth texture to the product.

9. The process of claim 8 wherein removing the air from the slurry is carried out under a vacuum of at least about 27 inches of mercury.

10. The process of claim 1 wherein the compressing step comprises subjecting the uniform slurry to an external pressure sufficient to hold the proteinaceous material together and the heat set protein slurry is subsequently cooled.

* * * * *

UNITED STATES PATENT AND TRADEMARK OFFICE
CERTIFICATE OF CORRECTION

PATENT NO. : 3,891,778
DATED : June 24, 1975
INVENTOR(S) : Robert A. Boyer

It is certified that error appears in the above-identified patent and that said Letters Patent are hereby corrected as shown below:

Column 1, line 27, "Sich" should read --Such--

Column 1, lines 52-53, delete "which percentage of fat as the fatty phase to produce a product" (second occurrence)

Column 11, line 2, the black square should read --8--

Signed and Sealed this fourth Day of November 1975

[SEAL]

Attest:

RUTH C. MASON
*Attesting Officer*

C. MARSHALL DANN
*Commissioner of Patents and Trademarks*